March 4, 1924.
F. M. STEVENS
KNIFE HANDLE
Filed Feb. 25, 1921
1,485,571
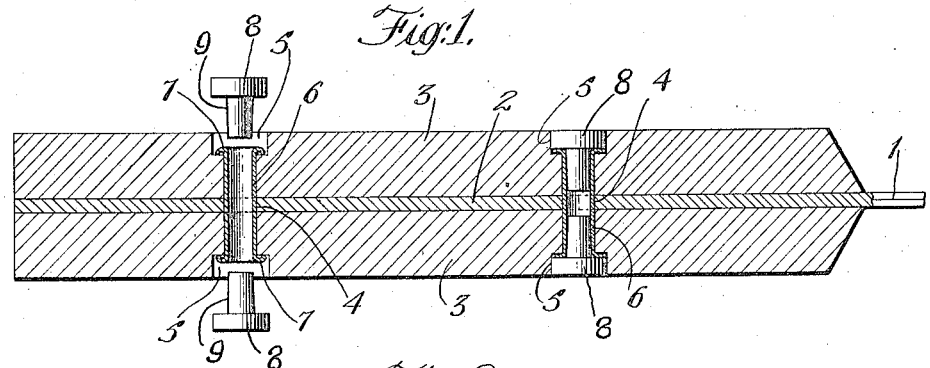
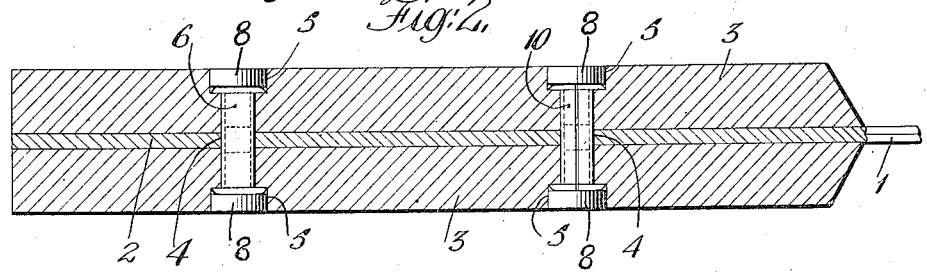
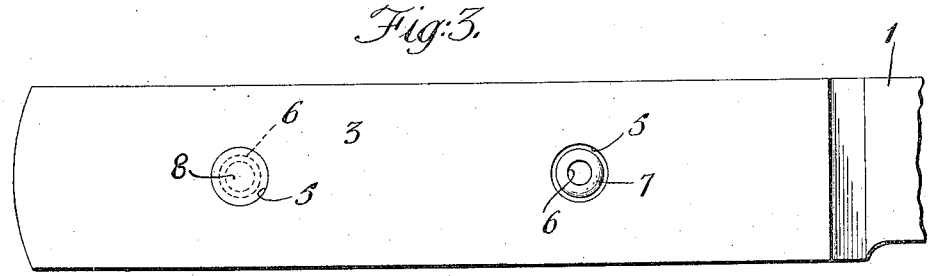
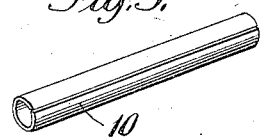
Inventor
Frederick M. Stevens,
By his Attorney Patented Mar. 4, 1924.

1,485,571

UNITED STATES PATENT OFFICE.

FREDERICK M. STEVENS, OF NEW YORK, N. Y., ASSIGNOR TO JOHN CHATILLON & SONS, A CORPORATION OF NEW YORK.

KNIFE HANDLE.

Application filed February 25, 1921. Serial No. 447,891.

*To all whom it may concern:*

Be it known that I, FREDERICK M. STEVENS, a citizen of the United States, and a resident of New York, in the county of New York and State of New York, have invented certain new and useful Improvements in Knife Handles, of which the following is a specification.

This invention relates to handles for knives, implements, tools, etc., and has for its object to provide a simple, cheap and ornamental way of fastening one or more handles to the shank portion of a blade, whereby the handle or handles will be firmly fastened and at the same time secure an ornamental appearance. A common way of fastening handles is by one or two piece rivets which pass through both the handle and the blade, which is objectionable because the setting pressure due to the headed fastening tends to split the handle and also does not form a smooth surface outside without extra finishing operations. Two piece fastenings tend to loosen in service.

By this invention, a tubular counter-sunk rivet is provided for fastening the handle or handles to the blade, and filling plugs are inserted in one or both ends of the tubular fastening to close it and at the same time fill out the counter-sink which contains the fastening. These plugs can be frictionally driven or forced into the tubular fastening and remain there throughout hard service. The invention may be said to comprise a counter-sunk tubular fastening carrying finishing or filling plugs, counter-sunk in the handle.

In the accompanying drawing,

Figure 1 is a section showing the partially completed article,

Figure 2 shows the completed article in section,

Figure 3 is a plan view showing one fastening completed and the other ready to receive the plug, Figure 4 shows one form of tubular rivet and Figure 5 shows a split tubular rivet.

1 represents the blade having the shank portion 2 to which will be attached one or two handle members 3, the blade and handle members having holes 4 with counter-sinks 5 in the handle members to receive the tubular rivet 6 having heads 7. 8 represents the filling plugs filling the counter-sinks 5 and having tapered shanks 9 to permit them to be driven into the tube 6 and frictionally held therein. The heads of the plugs are so made as to closely fit and fill out the counter-sinks 5 and preferably to be flush with the upper surface of the knife handle. Instead of the continuous tube 6 a split tube 10 may be used as shown in Figure 5. It will be understood that the invention may be employed to fasten a single blade to the handle using a tubular rivet counter-sunk at one end into the blade and at the other end into the handle, and two plugs, or a tubular rivet with a closed head at one end may be used and thereby requiring only one plug, but the common practice will be to use two handles on opposite sides of the blade with a tubular rivet and two plugs. The accompanying claims are intended to cover this and similar constructions within the scope of the invention.

What I claim is:

1. A tool having a handle portion provided with a hole, a handle having a countersunk hole registering therewith, a tubular headed fastening in said holes fastening said members together and within said countersink, and a headed plug frictionally engaging the bore of said fastening and fitting said countersink.

2. A tool having a handle fastened thereto by a tubular headed fastening, the headed ends of the fastening being in recesses countersunk below the respective surfaces, and a headed plug frictionally engaged in each end of the fastening to fill out said countersunk recesses.

3. The combination with a tool shank, of a handle member adapted to be fastened thereto, the handle member and shank being provided with a perforation through both of them, said perforation being counter-sunk on the side of the handle member away from the tool shank, a tubular split rivet in said perforation for holding the tool shank and handle member together, the head of said rivet being within the counter-sunk portion of the perforation, and a frictionally engaged filling plug retained inside the split rivet and in said counter-sunk portion of the perforation.

4. The combination with a tool shank, of a handle member on each side of said shank provided with a hole extending through them and the shank, the end portions of said hole being enlarged to form countersinks, a tubular split rivet in said hole having its ends headed in said countersinks, a headed plug in each countersink, fitting in each end of said tubular rivet and over the headed ends of the rivet with the outer end of each plug substantially flush with the surface of the handle member.

Signed at New York, in the county of New York and State of New York, this 17th day of February, A. D. 1921.

FREDERICK M. STEVENS.